US012674491B2

(12) United States Patent (10) Patent No.: US 12,674,491 B2

Kobayashi et al. (45) Date of Patent: Jul. 7, 2026

(54) PLUNGING TYPE CONSTANT VELOCITY UNIVERSAL JOINT

(71) Applicant: NTN CORPORATION, Osaka (JP)

(72) Inventors: Masazumi Kobayashi, Shizuoka (JP); Tatsuro Sugiyama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 274 days.

(21) Appl. No.: 18/684,300

(22) PCT Filed: Aug. 5, 2022

(86) PCT No.: PCT/JP2022/030127

§ 371 (c)(1),
(2) Date: Feb. 16, 2024

(87) PCT Pub. No.: WO2023/026826

PCT Pub. Date: Mar. 2, 2023

(65) Prior Publication Data

US 2024/0426349 A1 Dec. 26, 2024

(30) Foreign Application Priority Data

Aug. 26, 2021 (JP) ................................. 2021-138188

(51) Int. Cl.
 *F16D 3/227* (2006.01)
 *F16D 3/223* (2011.01)
(52) U.S. Cl.
 CPC .... *F16D 3/227* (2013.01); *F16D 2003/22303* (2013.01); *F16D 2003/22309* (2013.01); *Y10S 464/906* (2013.01)
(58) Field of Classification Search
 CPC .......... F16D 3/227; F16D 2003/22303; F16D 2003/22309; Y10S 464/906

(Continued)

(56) References Cited

U.S. PATENT DOCUMENTS

| 2009/0136287 A1 | 5/2009 | Kobayashi et al. |
| 2020/0063802 A1 | 2/2020 | Sugiyama |
| 2021/0172481 A1 | 6/2021 | Kobayashi et al. |

FOREIGN PATENT DOCUMENTS

| JP | 2007-85488 | 4/2007 |
| JP | 2018-132135 | 8/2018 |
| JP | 2019-190549 | 10/2019 |

OTHER PUBLICATIONS

International Search Report (ISR) issued Oct. 25, 2022 in International (PCT) Application No. PCT/JP2022/030127.

(Continued)

*Primary Examiner* — Greg Binda

(74) *Attorney, Agent, or Firm* — Wenderoth, Lind & Ponack, L.L.P.

(57) ABSTRACT

A plunging type constant velocity universal joint has six torque transmission balls, and a curvature center of a spherical outer peripheral surface and a curvature center of a spherical inner peripheral surface of a cage are offset toward opposite sides in an axial direction with respect to a joint center. The plunging type constant velocity universal joint is used at a normal operating angle of from 8° to 12°. A ratio $D_{BALL}/DS_{PCD}$ of a diameter ($D_{BALL}$) of the torque transmission ball to a spline pitch circle diameter ($DS_{PCD}$) of a coupling hole of an inner joint member is within a range of 0.80 to 0.86. A contact angle of the torque transmission ball and a linear track groove is within a range of 32° to 35°. A contact ratio of the torque transmission ball and the linear track groove is within a range of 1.05 to 1.08.

4 Claims, 7 Drawing Sheets

(58) Field of Classification Search
USPC ......................................................... 464/146
See application file for complete search history.

(56) References Cited

OTHER PUBLICATIONS

International Preliminary Report on Patentability and Written Opinion of the International Search Authority issued Feb. 27, 2024 in International (PCT) Application No. PCT/JP2022/030127.

PLUNGING TYPE CONSTANT VELOCITY UNIVERSAL JOINT

TECHNICAL FIELD

The present invention relates to a plunging type constant velocity universal joint, which is to be used for automobiles and various industrial machines.

BACKGROUND ART

In recent years, along with the market popularity of four-wheeled drive vehicles such as sport utility vehicles (SUV), constant velocity universal joints used in those vehicles have further been increased in maximum operating angle (30° or more, for example, 35°) and been set higher in position of a differential to increase travel performance. As a result, a vehicle mounting angle of the joint is increased, and the normal operating angle is further increased (8° or more, for example, 10°).

With regard to a drive shaft for an automobile, typically, a fixed type constant velocity universal joint is used on a drive wheel side (also referred to as "out-board side"), and a plunging type constant velocity universal joint is used on a differential side (also referred to as "in-board side"). The two constant velocity universal joints are coupled to each other through intermediation of an intermediate shaft. The fixed type constant velocity universal joint is capable of forming a large operating angle but does not slide in an axial direction. Meanwhile, the plunging type constant velocity universal joint is slidable in the axial direction, but is not capable of forming a large operating angle.

The fixed type constant velocity universal joint used on the drive wheel side has a maximum allowable angle of the joint which is set within the range of from about 46° to about 50° so as to deal with an angle given at the time of full steering. Meanwhile, the plunging type constant velocity universal joint used on the differential side is set within the range of from about 23° to about 30° so as to absorb movement of a suspension. In the plunging type constant velocity universal joint, typically, when there is given a full rebound state in which the suspension is maximally extended, the maximum operating angle is formed. On the other hand, as for the normal operating angle, a related-art normal operating angle in a drive shaft of such as a current passenger vehicle is relatively small, and normally, the joint is used at a normal operating angle of about 6°.

In general, for example, an SUV having a vehicle height higher than that of a passenger vehicle has a large angle of a drive shaft in a flat-ground traveling state (hereinafter referred to as "normal operating angle." The definition of the normal operating angle will be described later.), and movement of the suspension tends to be larger. There has been proposed a DOJ which achieves a large maximum operating angle larger than 25° and equal to or smaller than about 30° and downsizing (Patent Document 1).

PRIOR ART DOCUMENTS

Patent Documents

Patent Document 1: JP 2007-85488 A

SUMMARY OF THE INVENTION

Problems to be Solved by the Invention

In the DOJ constant velocity universal joint, when the operating angle is increased, a load acting on torque transmission balls increases, with the result that a contact pressure applied to track grooves of an outer joint member and an inner joint member also increases. However, in a full rebound state in which the operating angle is the maximum, wheels are not grounded to the ground surface, and a torque load is not applied to the wheels, and hence the contact pressure does not become a problem.

Meanwhile, when the vehicle mounting angle of the plunging type constant velocity universal joint is increased, and an angle which is normally used (normal operating angle) is increased, the durability of the constant velocity universal joint is extremely severe. That is, at the normal operating angle, the vehicle travels at high speed, and torque applied to the constant velocity universal joint is large.

In view of the above-mentioned problem, the present invention has an object to provide a plunging type constant velocity universal joint in which strength and durability are ensured for usage conditions in which an increase in maximum operating angle and an increase in normal operating angle are required.

Solution to the Problems

As a result of extensive studies and tests for achieving the above-mentioned object, the inventors of the present invention have reached the guideline for ensuring durability at a high normal operating angle (for example, about 10°) equivalently to that at a related-art normal operating angle (for example, about 6°). Then, the inventors of the present invention have focused on the two factors of an increase in maximum operating angle and an increase in normal operating angle as a point for internal specification setting of the plunging type constant velocity universal joint to obtain a new concept of mixing these factors and setting the internal specifications, thereby arriving at the present invention.

As a technical measure for achieving the above-mentioned object, according to the present invention, there is provided a plunging type constant velocity universal joint, comprising: an outer joint member comprising a cylindrical inner peripheral surface having six linear track grooves extending along an axial direction; an inner joint member comprising a spherical outer peripheral surface having six linear track grooves being opposed to the linear track grooves of the outer joint member and extending along the axial direction, the inner joint member having a coupling hole at a center portion thereof for coupling a shaft; six torque transmission balls incorporated between the linear track grooves of the outer joint member and the linear track grooves of the inner joint member; and a cage, which is configured to retain the torque transmission balls, and comprises a spherical outer peripheral surface and a spherical inner peripheral surface, which are guided in contact with the cylindrical inner peripheral surface of the outer joint member and the spherical outer peripheral surface of the inner joint member, respectively. A curvature center of the spherical outer peripheral surface and a curvature center of the spherical inner peripheral surface of the cage are offset toward opposite sides in the axial direction with respect to a joint center. The plunging type constant velocity universal joint is used at a normal operating angle of from 8° to 12°. A ratio $D_{BALL}/DS_{PCD}$ of a diameter ($D_{BALL}$) of the torque transmission ball to a spline pitch circle diameter ($DS_{PCD}$)) of the coupling hole of the inner joint member is set within a range of from 0.80 to 0.86. A contact angle ($\alpha$) of the torque transmission ball and the linear track groove is set within a range of from 32° to 35°. A contact ratio ($\Psi$) of the torque transmission ball and the linear track groove is set within a range of from 1.05 to 1.08. With the above-mentioned configuration, the plunging type constant velocity universal joint in which the strength and the durability are ensured for the usage conditions in which the increase in maximum operating angle and the increase in normal operating angle are required can be provided.

Specifically, it is preferred that a ratio $DT_{PCD}/DS_{PCD}$ of a pitch circle diameter ($DT_{PCD}$) of the linear track groove to the spline pitch circle diameter ($DS_{PCD}$) be set within a range of from 2.25 to 2.40. With this configuration, the track contact pressure can be suppressed while limiting the outer diameter of the outer joint member.

It is preferred that a ratio $F/DS_{PCD}$ of an offset amount (F) of the curvature center of the spherical outer peripheral surface and the curvature center of the spherical inner peripheral surface of the cage to the spline pitch circle diameter ($DS_{PCD}$) be set within a range of from 0.18 to 0.19. With this configuration, protrusion of the contact ellipse of the ball from the track groove can be limited, and the track contact pressure can be suppressed.

When a maximum operating angle of the plunging type constant velocity universal joint falls within a range of from 30° to 35°, the plunging type constant velocity universal joint is suitable for use in SUV or the like.

When a drive shaft comprises: the plunging type constant velocity universal joint mounted on an in-board side; and a fixed type constant velocity universal joint comprising eight torque transmission balls and being mounted on an out-board side, the drive shaft is suitable for use in SUV or the like.

Effects of the Invention

According to the present invention, it is possible to achieve the plunging type constant velocity universal joint in which strength and durability are ensured for usage conditions in which an increase in maximum operating angle and an increase in normal operating angle are required.

EMBODIMENTS OF THE INVENTION

Figure 1:
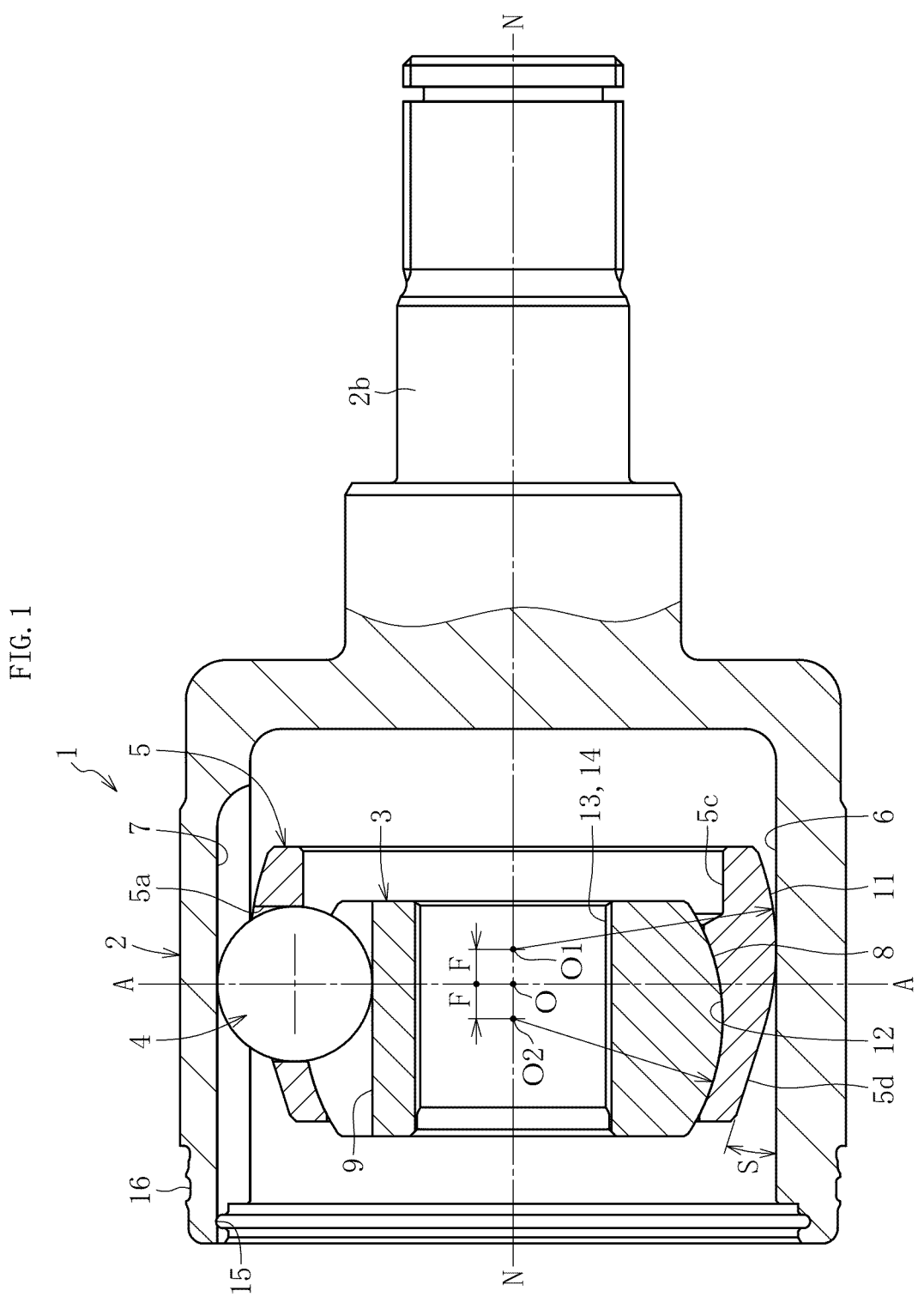
FIG. 1 is a longitudinal sectional view of a plunging type constant velocity universal joint according to a first embodiment of the present invention, and is a longitudinal sectional view taken along the line B-N-B of FIG. 2.
Figure 2:
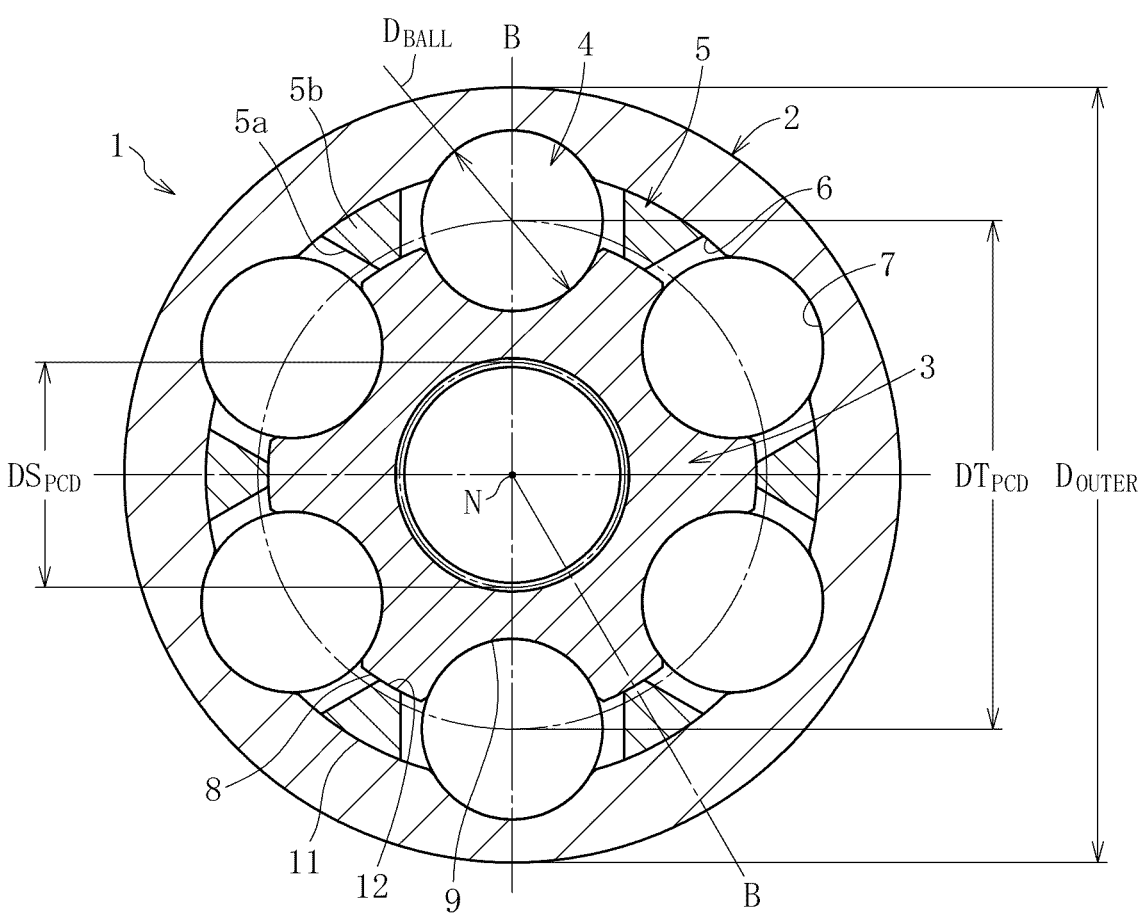
FIG. 2 is a transverse sectional view of the plunging type constant velocity universal joint according to the first embodiment of the present invention, and is a transverse sectional view taken along the line A-A of FIG. 1.
Figure 3:
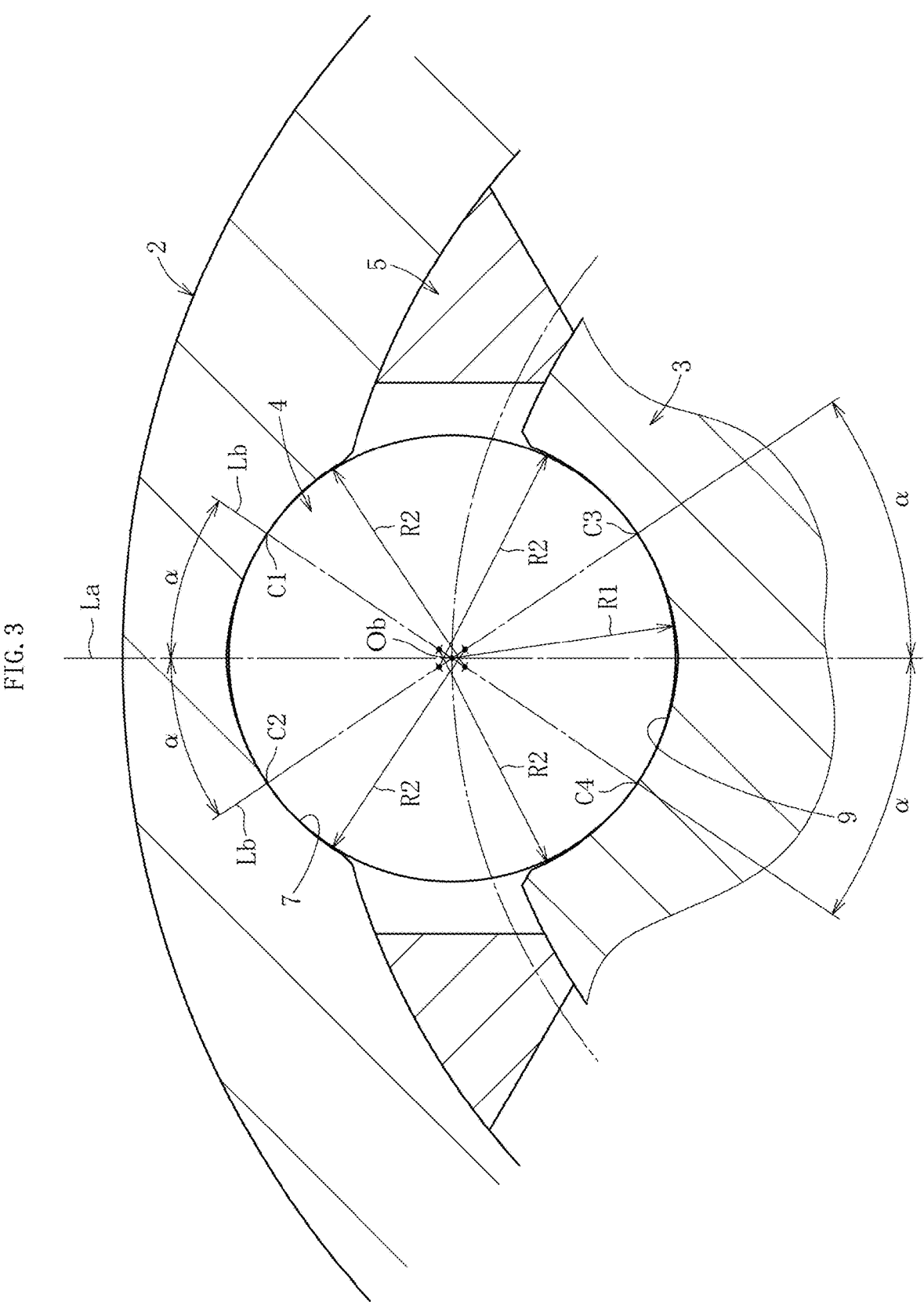
FIG. 3 is an enlarged transverse sectional view for illustrating one torque transmission ball and track grooves of FIG. 2.
Figure 4:
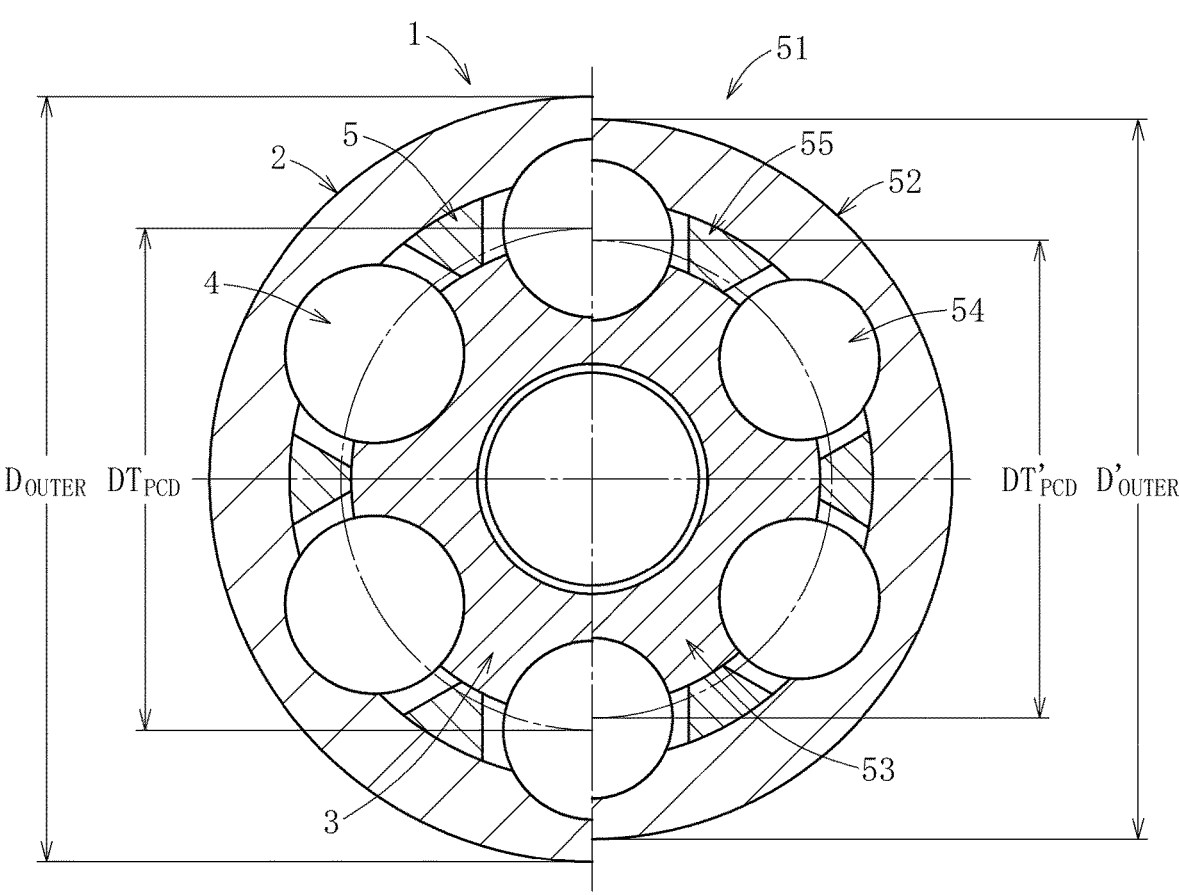
FIG. 4 is a view for illustrating transverse cross sections of the plunging type constant velocity universal joint of this embodiment and a related-art plunging type constant velocity universal joint for comparison.
Figure 5:
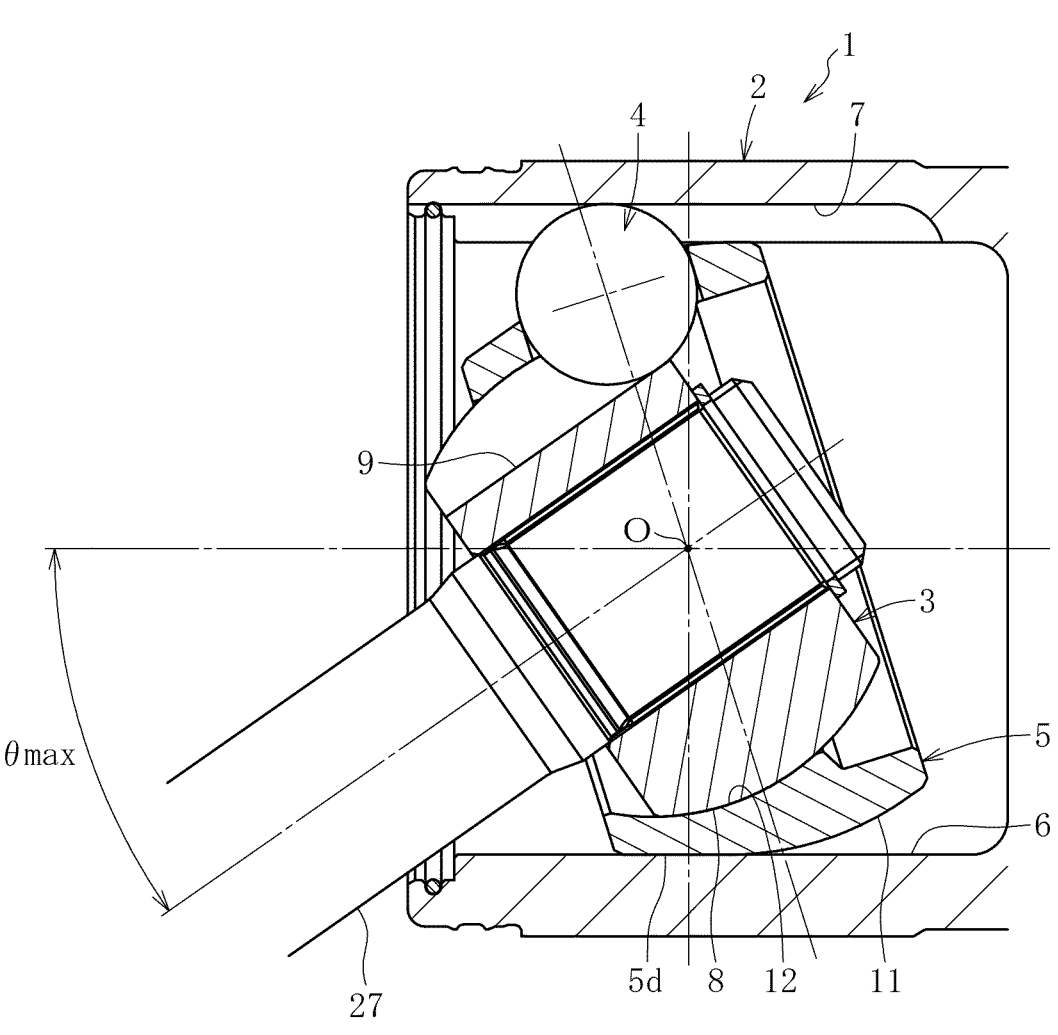
FIG. 5 is a longitudinal sectional view for illustrating a state in which the plunging type constant velocity universal joint of this embodiment forms a maximum operating angle.
Figure 6:
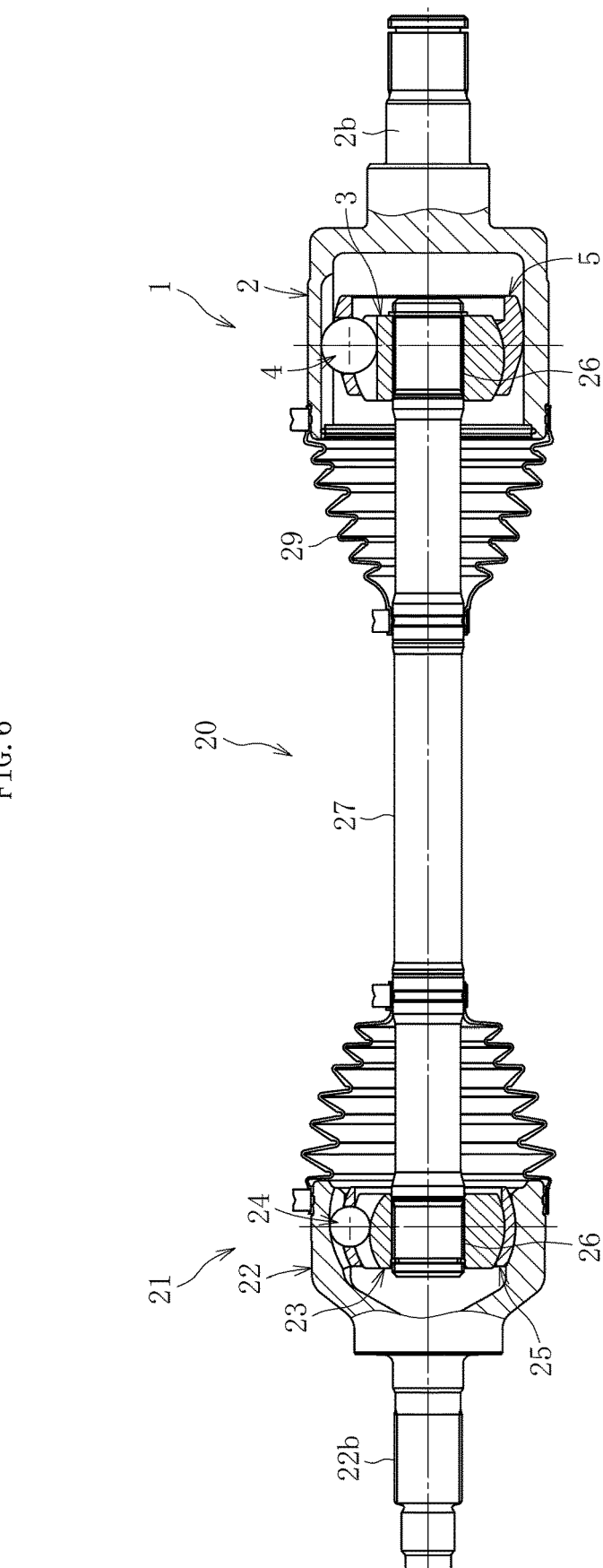
FIG. 6 is a longitudinal sectional view for illustrating a drive shaft on which the plunging type constant velocity universal joint of this embodiment and a fixed type constant velocity universal joint comprising eight torque transmission balls are mounted.
Figure 7:
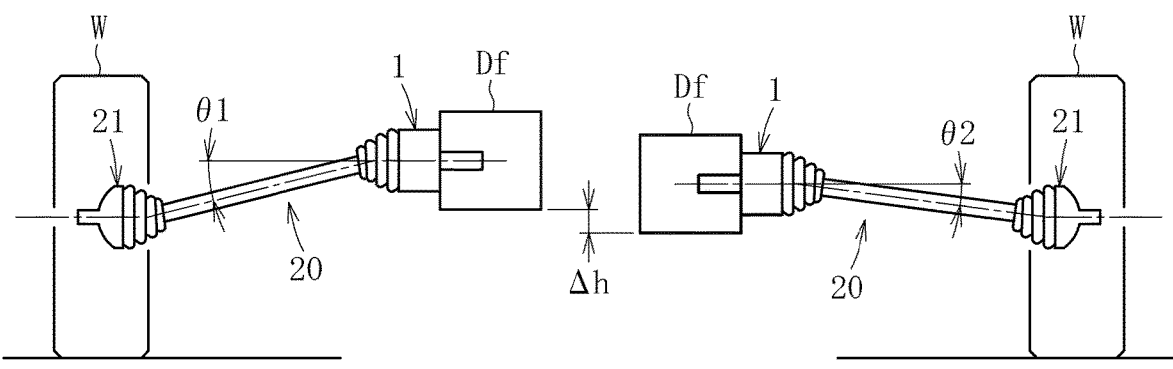
FIG. 7 is a schematic view for illustrating a state at a high normal operating angle and a state at a related-art normal operating angle for comparison.

A plunging type constant velocity universal joint according to a first embodiment of the present invention is described with reference to FIG. 1 to FIG. 7. FIG. 1 is a longitudinal sectional view of a plunging type constant velocity universal joint according to this embodiment, and is a longitudinal sectional view taken along the line B-N-B of FIG. 2. FIG. 2 is a transverse sectional view of the plunging type constant velocity universal joint according to this embodiment, and is a transverse sectional view taken along the line A-A of FIG. 1. FIG. 3 is an enlarged transverse sectional view for illustrating one torque transmission ball and track grooves on an upper side of FIG. 2. FIG. 4 is a view for illustrating transverse cross sections of the plunging type constant velocity universal joint of this embodiment and a related-art plunging type constant velocity universal joint for comparison. FIG. 5 is a longitudinal sectional view for illustrating a state in which the plunging type constant velocity universal joint of this embodiment forms a maximum operating angle. FIG. 6 is a longitudinal sectional view for illustrating a drive shaft on which the plunging type constant velocity universal joint of this embodiment and a fixed type constant velocity universal joint comprising eight torque transmission balls are mounted. FIG. 7 is a schematic view for illustrating a state at a high normal operating angle and a state at a related-art normal operating angle for comparison.

As illustrated in FIG. 1 and FIG. 2, a plunging type constant velocity universal joint 1 is a so-called double-offset plunging type constant velocity universal joint (sometimes abbreviated as "DOJ"), and mainly comprises an outer joint member 2, an inner joint member 3, torque transmission balls 4, and a cage 5. A cylindrical inner peripheral surface 6 of the outer joint member 2 has six track grooves 7. The track grooves 7 are formed at equal intervals in a circumferential direction and linearly extend along an axial direction. Aspherical outer peripheral surface 8 of the inner joint member 3 has track grooves 9 which are opposed to the track grooves 7 of the outer joint member 2. The track grooves 9 are formed at equal intervals in a circumferential direction and linearly extend along the axial direction. Six torque transmission balls (hereinafter simply referred to also as "balls") 4 are individually incorporated between the track grooves 7 of the outer joint member 2 and the track grooves 9 of the inner joint member 3. The balls 4 are received in pockets 5a of the cage 5.

The cage 5 comprises a spherical outer peripheral surface 11 and a spherical inner peripheral surface 12. The spherical outer peripheral surface 11 is fitted to and guided in contact with the cylindrical inner peripheral surface 6 of the outer joint member 2. The spherical inner peripheral surface 12 is fitted to and guided in contact with the spherical outer peripheral surface 8 of the inner joint member 3. The spherical outer peripheral surface 11 of the cage 5 has a curvature center O1. The spherical inner peripheral surface 12 has a curvature center O2. The curvature centers O1 and O2 are located on an axis line N, and are offset by equal distances F in the axial direction with respect to a joint center O. With this configuration, when the joint forms an operating angle, the balls 4 are always guided on a plane bisecting an angle formed by both axis lines of the outer joint member 2 and the inner joint member 3, thereby achieving transmission between two shafts with constant-velocity rotation.

A stop ring groove 15 is provided at an opening-side end portion of the outer joint member 2, and a stop ring (not shown) is mounted to the stop ring groove 15, thereby preventing an inner assembly illustrated in FIG. 1 comprising the inner joint member 3, the balls 4, and the cage 5 from moving out from the opening-side end portion of the outer joint member 2. The opening-side end portion of the outer joint member 2 has, on an outer periphery thereof, a boot-mounting groove 16. A stem portion (shaft portion) 2*b* is integrally formed on a counter-opening side of the outer joint member 2, and is coupled to a differential (not shown).

The spherical outer peripheral surface 8 of the inner joint member 3 has the linear track grooves 9, and hence a groove depth of each of the track grooves 9 becomes smaller as extending from a center of the inner joint member 3 in the axial direction toward both ends. A spline (including serration, which similarly applies to the following description) 14 is formed on a coupling hole 13 of the inner joint member 3. A shaft end portion of the intermediate shaft 27 (see FIG. 5) is spline-fitted to the coupling hole 13, and is fixed by a shoulder portion of the intermediate shaft 27 and the stop ring in the axial direction. In the plunging type constant velocity universal joint 1 according to this embodiment, in order to allow the maximum operating angle of 35°, the inner joint member 3 has an axial width which is set longer than that of a related-art product.

Six pockets 5*a* are formed on the axial center of the cage 5 indicated by the line A-A of FIG. 1 at equal intervals in a circumferential direction, and pillar portions 5*b* (see FIG. 2) are each provided between adjacent pockets 5*a*. A cutout 5*c* for receiving the inner joint member 3 to be incorporated therein is formed along an inner periphery of a large-diameter-side end portion of the cage 5. A stopper surface 5*d* of the cage 5 has a conical shape so that the stopper surface 5*d* is tangentially connected to the spherical outer peripheral surface 11. When the joint forms an operating angle, the cage 5 is inclined at half an angle formed by both axes of the outer joint member 2 and the inner joint member 3. Thus, an inclination angle S of the stopper surface 5*d* is set to 17.5°. With this configuration, the maximum allowable angle of the plunging type constant velocity universal joint 1 can be restricted.

As illustrated in FIG. 3, The transverse cross sections of the track groove 7 of the outer joint member 2 and the transverse section of the track groove 9 of the inner joint member 3 are each formed into a gothic arch shape, which is formed by a combination of two arcs, or an elliptical shape. Therefore, the ball 4 is held in angular contact with the track groove 7 at two points C1 and C2 and with the track groove 9 at two points C3 and C4.

The ball contact angle α refers to an angle α between a straight line La and a straight line Lb in FIG. 3. The straight line La is a center line of each of the transverse cross sections of the track grooves 7 and 9, and corresponds to the line B-N of FIG. 2. The straight line Lb is a straight line connecting each of contact points C1, C2, C3, and C4 of the ball 4 on side surfaces of the track grooves 7 and 9 to a center Ob of the ball 4.

As illustrated in FIG. 3, a curvature center of the curvature radius R2 of the track groove 9 of the inner joint member 3 is offset from a ball center Ob on the straight line Lb having the contact angle α. A curvature radius of the track groove 7 of the outer joint member 2 is also R2 similarly to the track groove 9 of the inner joint member 3. A radius of the ball 4 is R1. The ball contact ratio Ψ refers to a ratio R2/R1 of a curvature radius R2 of the transverse cross section of each of the track grooves 7 and 9 to a radius R1 (R1=$D_{BALL}$/2) of the ball 4.

FIG. 7 is a schematic view for illustrating a state at a high normal operating angle in which the plunging type constant velocity universal joint 1 of this embodiment is used and a state at a related-art normal operating angle for comparison. As illustrated in FIG. 7, in a drive shaft 20, a fixed type constant velocity universal joint 21 at an out-board end is coupled to a wheel W, and the plunging type constant velocity universal joint 1 at an in-board end is coupled to a differential Df. The left half in FIG. 7 shows a state at a high normal operating angle θ1, and the right half shows a state at a related-art normal operating angle θ2. In the case of the high normal operating angle θ1, the height of the differential Df from the ground is higher than that in the case of the related-art normal operating angle θ2 by Δh, thereby increasing travel performance. However, the normal operating angle increases, thereby increasing the load on the torque transmission balls.

Here, the normal operating angle in the claims and the Description is defined. The normal operating angle refers to an operating angle generated in a plunging type constant velocity universal joint for a drive shaft when a steering wheel is set to a straight advancing state in an automobile when one person rides on a horizontal and flat road surface. A related-art normal operating angle in a drive shaft for a current passenger vehicle or the like is relatively small, and is normally used at about 6°.

Next, the findings and the concepts in the development process of the present invention are described. As a result of extensive studies and tests for adapting the joint to a usage condition in which an increase in maximum operating angle and an increase in normal operating angle are required, the inventors of the present invention have reached the guideline for ensuring durability at a high normal operating angle (for example, about 10°) equivalently to that at a related-art normal operating angle (for example, about 6°). Then, the inventors of the present invention have focused on the two factors of the increase in maximum operating angle and the increase in normal operating angle as a point for the internal specification setting of the plunging type constant velocity universal joint to obtain a new concept of mixing these factors and setting the internal specifications, thereby arriving at the present invention.

Based on the guideline and the concept described above, first, a ball diameter of a torque transmission ball which is a fundamental internal specification which dominates a contact pressure between a ball and a track groove is found in the following manner. That is, as shown in Table 1, it is found out that the degree of the influence on the size increase in ball diameter is about 50% in each of an increase in angle by 35° in a maximum operating angle and an increase in angle by 10° in the normal operating angle. In addition, for a plunging type constant velocity universal joint adapted to required usage conditions (maximum operating angle of 35°, normal operating angle of 10°), it is found out that a ratio $D_{BALL}/DS_{PCD}$ of a diameter $D_{BALL}$ of the torque transmission ball to a spline pitch circle diameter $DS_{PCD}$ of a coupling hole of an inner joint member is set within a range of from 0.80 to 0.86. The above procedure is a first attempt to those skilled in the art.

(Note) The difference in one size of the ball diameter is 1/32 inches (about 0.8 mm).

TABLE 1

| Factor | Size Increase in Ball Diameter | Degree of Influence on Size Increase | Ratio $D_{BALL}/DS_{PCD}$ |
|---|---|---|---|
| Increase in Maximum Operating Angle | 1 to 2 Size | About 50% | 0.80 to 0.86 |
| Increase in Normal Operating Angle | 1 to 2 Size | About 50% | |

The size of the joint can be represented by a spline diameter of a coupling hole (shaft) of the inner joint member, and hence the dimension value described above and a dimension value described later are rendered dimensionless in a ratio of the coupling hole of the inner joint member to a spline PCD.

The durability of the DOJ plunging type constant velocity universal joint decreases as a use operating angle is higher. In the DOJ plunging type constant velocity universal joint, when an operating angle is given, a force acting on the ball varies during one rotation, and at the maximum load, a load larger than that at the operating angle of 0° by several percent to several times depending on the angle is applied. For example, when the normal operating angle increases, and the normal operating angle is increased from the current normal operating angle of 6° to 10°, the maximum load applied to the ball increases by from about 20% to about 30%.

The ratio $D_{BALL}/DS_{PCD}$ of the diameter $D_{BALL}$ of the torque transmission ball to the spline pitch circle diameter $DS_{PCD}$ of the coupling hole of the inner joint member as described above is set within the range of from 0.80 to 0.86, and based on this, there is obtained a confirmation that the dimensions affecting on the contact pressure between a ball and a track groove are adjusted to relax the contact pressure so that the durability at the high normal operating angle (for example, about 10°) can be ensured equivalently to that at the related-art normal operating angle (for example, about 6°).

The dimensions affecting on the contact pressure between a ball and a track groove in the DOJ plunging type constant velocity universal joint are (1) a ball diameter, (2) a contact angle of the track groove, (3) a contact ratio of the track groove, (4) a track PCD, and (5) a cage offset. In Table 2, influences of the dimensions in the items (1) to (5) described above on the contact pressure between a ball and a track groove are shown. Further, concerns in those cases are shown together.

TABLE 2

| | Item | Influence on Track Contact Pressure | Concerns |
|---|---|---|---|
| (1) | Ball Diameter | Contact pressure decreases as ball diameter is larger | When ball diameter is excessively large, thicknesses of outer and inner joint members decrease to decrease strength, or when thickness is ensured, outer diameter of outer joint member increases. |
| (2) | Contact Angle of Track Groove | Contact pressure decreases as contact angle is larger | When contact angle is excessively large, chipping of shoulder portion due to protrusion of ball contact ellipse from track groove is caused. |
| (3) | Contact Ratio of Track Groove | Contact pressure decreases as contact ratio is smaller | When contact ratio is excessively small, chipping of shoulder portion due to protrusion of ball contact ellipse from track groove is caused. |
| (4) | Track PCD | Contact pressure decreases as track PCD is larger | When track PCD is excessively large, outer diameter of outer joint member increases. |
| (5) | Cage Offset | Contact pressure decreases as cage offset is smaller | When cage offset is excessively large, radial moving amount of ball at high operating angle increases, and hence increase in thickness of cage is required to decrease track groove depth of inner joint member, thereby causing chipping of shoulder portion due to protrusion of ball contact ellipse from track groove. |

In order to suppress the contact pressure between a ball and a track groove, it is not enough just to take a measure of simply increasing the ball diameter, and the optimum values of the respective items are found out by comprehensively setting the contact angle of track groove, the contact ratio of the track groove, the track PCD, the cage offset amount, and the like. The internal specifications of the plunging type constant velocity universal joint 1 of this embodiment are shown in Table 3.

TABLE 3

| | Item | Product of Present Invention | Related-art Product |
|---|---|---|---|
| (1) | Ball Diameter ($D_{BALL}$)/Spline PCD ($DS_{PCD}$) | 0.80 to 0.86 | 0.74 to 0.80 |
| (2) | Contact Angle $\alpha$ of Track Groove | 32° to 35° | 30° to 35° |
| (3) | Contact Ratio $\Psi$ of Track Groove | 1.05 to 1.08 | 1.02 to 1.08 |
| (4) | Track PCD($DT_{PCD}$)/Spline PCD($DS_{PCD}$) | 2.25 to 2.40 | 2.10 to 2.25 |
| (5) | Cage Offset Amount F/Spline PCD($DS_{PCD}$) | 0.18 to 0.19 | 0.17 to 0.18 |

For visual supplementation with regard to the setting of the internal specifications described above, transverse cross sections of the plunging type constant velocity universal joint 1 according to this embodiment and the related-art product are illustrated in FIG. 4 for comparison. The plunging type constant velocity universal joint 1 according to this embodiment is illustrated on the left half of a center line extending in an up-and-down direction on the sheet of FIG. 4, and the related-art product is illustrated on the right half. Components of the related-art product corresponding to the plunging type constant velocity universal joint 1 according to this embodiment are denoted by reference symbols which are obtained by adding 50 to the reference symbols used for this embodiment, and a track groove PCD and an outer ring outer diameter are denoted by reference symbols $DT'_{PDC}$ and $D'_{OUTER}$, respectively. In the plunging type constant velocity universal joint 1 according to this embodiment, the outer diameter of the outer joint member 2, that is, the outer ring outer diameter $D_{OUTER}$ is larger by about two sizes (5% to 10%) than the related-art product, but is practically applicable.

FIG. 5 is an illustration of a state in which the plunging type constant velocity universal joint 1 according to this embodiment forms a maximum operating angle θmax. The stopper surface 5*d* of the cage 5 is brought into abutment against the cylindrical inner peripheral surface 6 of the outer joint member 2, thereby restricting the maximum allowable angle of the plunging type constant velocity universal joint 1. The maximum operating angle θmax is 35°.

FIG. 6 is an illustration of the drive shaft 20 to which the plunging type constant velocity universal joint 1 according to this embodiment is applied. With regard to the drive shaft 20, a fixed type constant velocity universal joint 21 is coupled to one end of the intermediate shaft 27, and the plunging type constant velocity universal joint 1 according to this embodiment is coupled to another end of the intermediate shaft 27. The outer joint member 2 of the double-offset plunging type constant velocity universal joint 1 comprises a shaft section 2*b* extending in the axial direction from a bottom portion of a cup section. The fixed type constant velocity universal joint 21 is a Rzeppa-type constant velocity universal joint using eight balls, and comprises an outer joint member 22, an inner joint member 23, balls 24, and a cage 25. The outer joint member 22 comprises a shaft section 22*b* extending in the axial direction from a bottom portion of the cup section. The inner joint member 23 is received along an inner periphery of the cup section of the outer joint member 22. The balls 24 are arranged between the outer joint member 22 and the inner joint member 23, and serve as torque-transmission elements. The cage 25 is arranged between a spherical inner peripheral surface of the outer joint member 22 and a spherical outer peripheral surface of the inner joint member 23, and is configured to retain the balls 24.

The intermediate shaft 27 has splines 26 for torque transmission on radially outer parts at both ends of the intermediate shaft 27. The spline 26 on the in-board side is spline-fitted to the inner joint member 3 of the plunging type constant velocity universal joint 1, thereby coupling the intermediate shaft 27 and the inner joint member 3 of the plunging type constant velocity universal joint 1 to each other in a torque-transmittable manner. Further, the spline 26 on the out-board side is spline-fitted to the inner joint member 23 of the fixed type constant velocity universal joint 21, thereby coupling the intermediate shaft 27 and the inner joint member 23 of the fixed type constant velocity universal joint 21 to each other in a torque-transmittable manner.

Grease serving as a lubricant is sealed in each of the constant velocity universal joints 1 and 21. In order to prevent leakage of the grease to the outside and entry of a foreign matter from the outside of the joint, a bellows boot 29 is provided between the outer joint member 2 of the double-offset plunging type constant velocity universal joint 1 and the intermediate shaft 27, and a bellows boot 30 is provided between the outer joint member 22 of the fixed type constant velocity universal joint 21 and the intermediate shaft 27.

Figure 8:
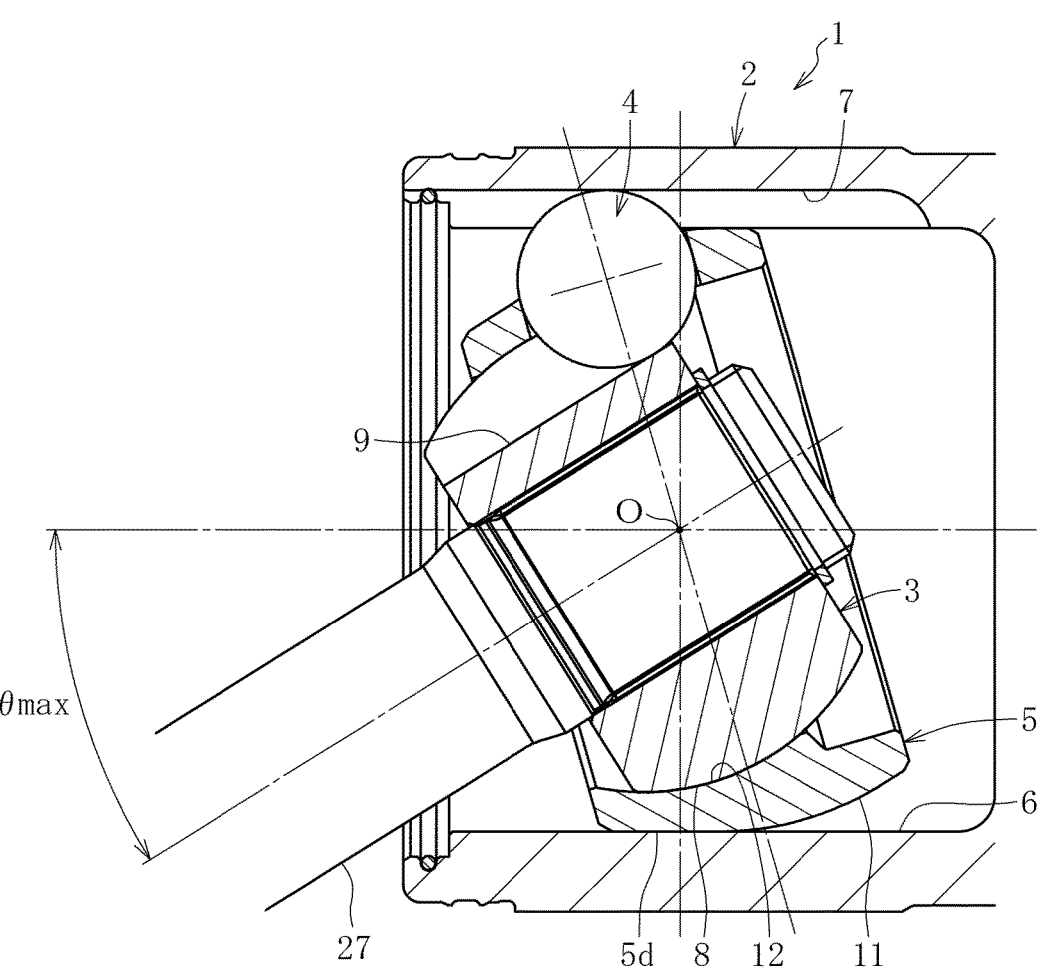
FIG. 8 is a longitudinal sectional view for illustrating a state in which a plunging type constant velocity universal joint according to a second embodiment of the present invention forms a maximum operating angle.

A plunging type constant velocity universal joint according to a second embodiment of the present invention is described with reference to FIG. 8. FIG. 8 is a longitudinal sectional view for illustrating a state in which a plunging type constant velocity universal joint 1 according to this embodiment forms a maximum operating angle. The plunging type constant velocity universal joint of this embodiment is different from the plunging type constant velocity universal joint of the first embodiment described above in a value of the maximum operating angle. Other configurations are the same as those of the first embodiment, and hence portions having the same functions are denoted by the same reference symbols, and the contents described in the first embodiment are applied.

In the plunging type constant velocity universal joint of this embodiment, a maximum operating angle θmax is 32°, and a normal operating angle is 10° which is equal to that in the plunging type constant velocity universal joint of the first embodiment. A dimensional difference (dimension interval) of one size of a ball diameter is 1/32 inch. Thus, internal specifications of the plunging type constant velocity universal joint 1 of this embodiment, which include (1) a ball diameter $(D_{BALL})$/a spline PCD $(DS_{PCD})$, (2) a contact angle α of a track groove, (3) a contact ratio $\Psi$ of a track groove, (4) a track PCD $(DT_{PCD})$/a spline PCD $(DS_{PCD})$, and (5) a cage offset amount F/a spline PCD $(DS_{PCD})$, are the same values as those in the plunging type constant velocity universal joint 1 of the first embodiment. An inclination angle S of a stopper surface 5*d* is set to 16°.

In the plunging type constant velocity universal joint of each of the embodiments described above, the maximum operating angle of 32° or 35° and the normal operating angle of 10° are exemplified. However, the present invention is not limited thereto, and is practically applicable when the maximum operating angle is from about 30° to about 35° and the normal operating angle is from about 8° to about 12°.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS

1 plunging type constant velocity universal joint
2 outer joint member
3 inner joint member
4 torque transmission ball
5 cage
5*a* pocket
5*d* stopper surface
6 cylindrical inner peripheral surface
7 track groove
8 spherical outer peripheral surface
9 track groove
11 spherical outer peripheral surface 12 spherical inner peripheral surface
13 coupling hole
14 spline
20 drive shaft
21 fixed type constant velocity universal joint
$D_{BALL}$ ball diameter
$D_{OUTER}$ outer ring outer diameter
$DT_{PCD}$ pitch circle diameter of track groove
$DS_{PCD}$ spline large diameter
F offset amount
O joint center
O1 curvature center
O2 curvature center
S inclination angle
$\alpha$ ball contact angle
$\theta$max maximum operating angle
$\Psi$ ball contact ratio

The invention claimed is:

1. A plunging type constant velocity universal joint, comprising:

an outer joint member comprising a cylindrical inner peripheral surface having six linear track grooves extending along an axial direction;

an inner joint member comprising a spherical outer peripheral surface having six linear track grooves being opposed to the linear track grooves of the outer joint member and extending along the axial direction, the inner joint member having a coupling hole at a center portion thereof for coupling a shaft;

six torque transmission balls incorporated between the linear track grooves of the outer joint member and the linear track grooves of the inner joint member; and a cage, which is configured to retain the torque transmission balls, and comprises a spherical outer peripheral surface and a spherical inner peripheral surface, which are guided in contact with the cylindrical inner peripheral surface of the outer joint member and the spherical outer peripheral surface of the inner joint member, respectively, wherein a curvature center of the spherical outer peripheral surface and a curvature center of the spherical inner peripheral surface of the cage are offset toward opposite sides in the axial direction with respect to a joint center, wherein the plunging type constant velocity universal joint is used at a normal operating angle of from 8° to 12°, wherein a ratio $D_{BALL}/DS_{PCD}$ of a diameter ($D_{BALL}$) of the torque transmission ball to a spline pitch circle diameter ($DS_{PCD}$) of the coupling hole of the inner joint member is set within a range of from 0.80 to 0.86, wherein a contact angle ($\alpha$) of the torque transmission ball and the linear track groove is set within a range of from 32° to 35°, wherein a contact ratio ($\psi$) of the torque transmission ball and the linear track groove is set within a range of from 1.05 to 1.08, and wherein a ratio $DT_{PCD}/DS_{PCD}$ of a pitch circle diameter ($DT_{PCD}$) of the torque transmission balls to the spline pitch circle diameter ($DS_{PCD}$) is set within a range of from 2.25 to 2.40.

2. The plunging type constant velocity universal joint according to claim 1, wherein a ratio $F/DS_{PCD}$ of an offset amount (F) of the curvature center of the spherical outer peripheral surface and the curvature center of the spherical inner peripheral surface of the cage to the spline pitch circle diameter ($DS_{PCD}$) is set within a range of from 0.18 to 0.19.

3. The plunging type constant velocity universal joint according to claim 1, wherein a maximum operating angle of the plunging type constant velocity universal joint falls within a range of from 30° to 35°.

4. A drive shaft, comprising:

the plunging type constant velocity universal joint according to claim 1 mounted on an in-board side; and a fixed type constant velocity universal joint comprising eight torque transmission balls and being mounted on an out-board side.

* * * * *